(12) United States Patent
Jakunin et al.

(10) Patent No.: US 12,556,047 B2
(45) Date of Patent: Feb. 17, 2026

(54) FIREPROOF COVER, FIREPROOF PUMP ASSEMBLY AND USE THEREOF

(71) Applicant: Hanning Elektro-Werke Gmbh & Co. KG, Oerlinghausen (DE)

(72) Inventors: Vitali Jakunin, Oerlinghausen (DE); Thomas Pflug, Bielefeld (DE); Norbert Krogmeier, Bielefeld (DE)

(73) Assignee: Hanning Elektro-Werke Gmbh & Co. KG, Paderborn (DE)

( * ) Notice: Subject to any disclaimer, the term of this patent is extended or adjusted under 35 U.S.C. 154(b) by 40 days.

(21) Appl. No.: 18/124,408

(22) Filed: Mar. 21, 2023

(65) Prior Publication Data

US 2023/0307979 A1    Sep. 28, 2023

(30) Foreign Application Priority Data

Mar. 22, 2022 (DE) .................. 10 2022 106 697.5

(51) Int. Cl.
*H02K 1/18* (2006.01)
*F04D 13/06* (2006.01)
(Continued)

(52) U.S. Cl.
CPC ......... *H02K 1/185* (2013.01); *F04D 13/0606* (2013.01); *F04D 29/406* (2013.01);
(Continued)

(58) Field of Classification Search
CPC .......... H02K 1/185; H02K 5/225; H02K 7/14; H02K 5/08; F04D 13/0606; F04D 29/406; F04D 29/026
See application file for complete search history.

(56) References Cited

U.S. PATENT DOCUMENTS

| 3,196,300 A * | 7/1965 | Carlson | H02K 5/06 310/64 |
| 6,326,879 B1 * | 12/2001 | Hangmann | H01H 37/043 337/380 |

(Continued)

FOREIGN PATENT DOCUMENTS

| CN | 205265414 | * | 5/2016 | ............. H02K 11/02 |
| CN | 205265414 U | | 5/2016 | |

(Continued)

OTHER PUBLICATIONS

CN205265414 translation (Year: 2024).*

(Continued)

*Primary Examiner* — David N Brandt
(74) *Attorney, Agent, or Firm* — Muncy, Geissler, Olds & Lowe, P.C.

(57) ABSTRACT

A fireproof cover for a stator winding of a stator, in particular of electromotive pumps, comprising two or more fire protection caps. The fire protection caps are made of a flame retardant material and can be placed together in an engagement position. The fire protection caps in the engagement position form a knockout opening for carrying through an iron core of the stator and form such a closed fireproof casing for the stator winding, which, however, is air-permeable through a joining gap between the fire protection caps and/or between at least one fire protection cap and the iron core, that as a result of a coil burn of the stator winding, flying sparks and flame propagation to components lying outside the fireproof casing are prevented.

11 Claims, 6 Drawing Sheets

(51) Int. Cl.
  *F04D 29/02* (2006.01)
  *F04D 29/40* (2006.01)
  *H02K 5/08* (2006.01)
  *H02K 5/22* (2006.01)
  *H02K 7/14* (2006.01)

(52) U.S. Cl.
  CPC ............... *H02K 5/225* (2013.01); *H02K 7/14* (2013.01); *F04D 29/026* (2013.01); *H02K 5/08* (2013.01)

(56) References Cited

U.S. PATENT DOCUMENTS 8,624,451 B2 * 1/2014 Shi ..................... H02K 5/08
  310/43
2006/0131971 A1 * 6/2006 Hangmann ............ H02K 7/118
  310/80

FOREIGN PATENT DOCUMENTS

| CN | 205304456 U | 6/2016 |
|---|---|---|
| DE | 2400379 A1 | 7/1975 |
| DE | 8801239 U1 | 6/1989 |

OTHER PUBLICATIONS acelabusa.com; Product Guides _ The Art and Science of Zinc Cladding_ An Introductory Overview pdf from acelabusa.com/product-guides/zinc-cladding (Year: 2025).*

* cited by examiner

FIREPROOF COVER, FIREPROOF PUMP ASSEMBLY AND USE THEREOF

This nonprovisional application claims priority under 35 U.S.C. § 119(a) to German Patent Application No. 10 2022 106 697.5, which was filed in Germany on Mar. 22, 2022, and which is herein incorporated by reference.

BACKGROUND OF THE INVENTION

Field of the Invention

The invention relates to a fireproof cover for a stator winding of a stator, in particular of electromotive pumps. Furthermore, the invention relates to a fireproof pump assembly for pumping liquids, and the use of the same in a household appliance, in particular an ice machine.

Description of the Background Art

In the case of electromotive drives, such as those used to drive a pump for pumping liquids, a so-called coil burn is a known problem. In the event of a coil burn, an electrical short circuit occurs within the stator winding as a result of aged wire insulation, resulting in a rapid rise in temperature. Although some electric drives have thermal fuse systems, such as a thermal switch, a fuse or an impedance, in order to be able to interrupt the energy supply in the event of a rise in temperature, these thermal fuse systems are usually too slow to be able to interrupt the energy supply in an electrical short circuit in the stator winding in time. In this respect, a coil burn poses a high fire hazard for surrounding components. Since the coil burn usually occurs as a result of the aged wire insulation of the stator winding, i.e., at the end of the service life of the stator winding, this reduces the service life of the entire electric drive or household appliance in which the drive is installed. This risk of age-related coil burn is particularly high for household appliances that are generally operated in continuous operation, such as ice machines.

In the existing pump assemblies with an electromotive pump in water-carrying applications, the stator winding is often covered with plastic caps, or a casing formed therefrom. These plastic caps only serve as contact protection. In this case, ventilation grilles are usually provided in the plastic caps or in the casing for improved heat dissipation. In the event of coil burn, this design provides little protection against the spread of flames to surrounding components. A high supply of oxygen can reach the burning stator winding via the ventilation grille, whereby the coil burn or the formation of flames can be sustained and spread unhindered. Flames and sparks can escape through the ventilation grille and ignite components made of flammable material present in the environment. Flames are usually caused by burning the enameled wire coating of the wire insulation of the stator winding. Flying sparks can occur as a result of liquid copper spatter. In addition, it is known to completely coat the stator winding by a suitable plastic mass, for example thermoplastic, thermoset or casting resin. The strong temperature rise as a result of an electrical short circuit of the stator winding can lead to liquefaction of the coating or overmolding inside or to evaporation of the enameled wire coating. Eruptive liquid or gaseous material discharge with strong flame formation is the result.

There is therefore a need for a fire protection solution which prevents coil burn or flames from spreading to surrounding components in the event of a coil burn.

SUMMARY OF THE INVENTION

It is therefore an object of the present invention to provide a fireproof cover for a stator winding of a stator or a fireproof pump assembly which prevents fire or flame propagation to surrounding components in the event of a coil burn. Further, the object is achieved by a use according to the invention.

To achieve the object, the invention has the features of claim 1. Accordingly, a fireproof cover for a stator winding of a stator, in particular of electromotive pumps, comprises two or more fire protection caps, wherein the fire protection caps are made of a flame-proofing material (flame retardant) and can be placed together in an engagement position. In the engagement position, the fire protection caps form a knock-out opening for carrying through an iron core of the stator and such a closed fireproof casing for the stator winding, which, however, is air-permeable through a joining gap between the fire protection caps or between at least one fire protection cap and the iron core, that as a result of a coil burn of the stator winding, flying sparks and flame propagation to components outside the fireproof casing are prevented.

An advantage of the invention is that the fire protection caps of the fireproof cover in the event of a coil burn of the stator winding provide a flameproofing enclosure, which prevents fire or flame propagation and flying sparks to surrounding components. The fireproof cover according to the invention is designed such that it withstands the high temperatures and flames of a coil burn until the coil wire of the stator winding has melted, and a further current supply is prevented. For this purpose, the fire protection caps are made of flameproofing material, which can withstand the flames in a coil burn for a sufficient time without severe deforming or melting. Furthermore, the fireproof casing formed by the fire protection caps in the engagement position forms an almost completely enclosed, i.e., almost air-impermeable enclosure for the stator winding, so that the atmospheric oxygen supply that promotes coil burn is prevented. This limited oxygen supply also significantly reduces the risk of flame formation in the event of a coil burn. The at least one joining gap supplying the fireproof casing with air permeability allows for flue gas to escape from the fireproof casing in the event of a coil burn, so that overpressure is prevented. In addition, the at least one joining gap is dimensioned such that uncontrolled flying sparks into the environment are prevented. The fire protection caps are designed in such a way that they can be applied to the stator with minimal effort.

The core idea of the invention is to enclose the stator winding of a stator with a fireproof casing made of flame-proofing material.

The fire protection caps can have a minimum wall thickness of 3 mm at the height of the stator winding. The wall thickness of the fire protection caps is chosen such that they can withstand the high temperatures and a possible flame build-up in a coil burn without strong deformation or melting until the coil wire of the stator winding has melted. The wall thickness in the specified areas provides the fire protection caps with the necessary mechanical stability or sufficient material resistance to flame retardant material.

The fire protection caps can be made of flame retardant plastics and particularly preferably made of polyamide having at least 25 weight percent glass fibers or halogenated, in particular brominated, polyamide. Of course, this choice of materials is not to be understood conclusively.

At least one of the fire protection caps can comprise one or more cap openings for carrying through electrical lines or electrical connection contacts, which serve to supply current to the stator winding. In this respect, existing contacting options for electrical drives, such as plug contacts or the like, can be used. In addition to the joining gap, the at least one cap opening ensures the air permeability of the fireproof casing, which is provided to prevent overpressure inside the fireproof casing as a result of flue gas formation.

The fire protection caps can be connected to each other via detachable connecting means and preferably latching fasteners. Advantageously, the fire protection caps can thus be connected to each other or placed into the engagement position without using tools. As latching fasteners, latching hooks and latching lugs molded to the fire protection caps are used, which form latching connections in the engagement position.

In practice, the wound and insulated coil wire of the stator winding is often not wound directly onto the iron core of the stator, but on a coil body enclosing the iron core. The stator winding and the coil body form a pre-assembled unit which can be pushed onto the iron core. The stator formed from this unit and the iron core can be provided as a pre-assembled stator unit.

The coil body may advantageously be made of a flame retardant material like the fire protection caps, whereby the stator winding wound on the coil body can also be enclosed almost completely with flame retardant material against the iron core and together with the fireproof casing formed from the fire protection caps.

The fire protection caps can have guide bars for the at least one coil body of the stator winding, so that the stator can be pushed into the fire protection caps and the coil body is guided between the guide bars. Advantageously, the fire protection caps are supported on the coil body of the stator. The guide bars can be formed as molded wall projections or as a collar or collar section.

The fireproof casing can be formed as a two-part hollow body and has a tub-shaped first fire protection cap with a cap bottom and with a circumferential cap collar protruding from the cap bottom, and a second fire protection cap U-shaped in profile cross-section with a connecting section and with two leg sections protruding from the connecting section to the same side. The cap collar of the second fire protection cap is placed on the leg ends of the leg sections of the first fire protection cap protruding from the connecting section. Brought to the engagement position, the first and second fire protection caps thus form an essentially square-shaped fireproof casing with an essentially square knockout opening for carrying through the iron core of the stator.

A fireproof pump assembly for conveying liquids, in particular in a household appliance, can comprise an electromotive drive with a can, which comprises a can pot and a can flange protruding from the can pot, with a stator and with a rotor shaft held in the can pot so as to be rotatable relative to the stator. The stator comprises an iron core placed on the can pot, in particular a magnetized stack of stator sheets, and at least one coil body enclosing the iron core and wound with a stator winding. Furthermore, the fireproof pump assembly comprises an impeller held at the rotor shaft and a pump casing held at the can flange with a conveying chamber receiving the impeller and with an inlet nozzle and with a drain nozzle.

To achieve the object, the invention is characterized in that the fireproof pump assembly comprises a fireproof cover, in particular a fireproof cover according to the invention, for the at least one stator winding. The fireproof cover comprises two or more fire protection caps made of a flame retardant material and placed together in an engagement position, wherein the fire protection caps in the engagement position form a knockout opening for carrying through the iron core of the stator and wherein the fire protection caps substantially form such a closed fireproof casing for the stator winding, which, however, is air-permeable through a joining gap between the fire protection caps or between at least one fire protection cap and the iron core, that as a result of a coil burn of the stator winding, flying sparks and flame propagation to components outside the fireproof casing are prevented.

An advantage of the invention is that the fireproof cover houses the at least one stator winding in a flame retardant manner, whereby in the event of a coil burn of the stator winding a spread of the coil burn or any flames formed to surrounding components of the fireproof pump assembly is prevented. The fire protection caps are manufactured for this purpose from a flame retardant material and form in the engagement position an essentially closed fireproof casing for the stator winding. The fireproof casing is designed such that it can withstand the high temperatures and flames in a coil burn until the coil wire of the burning stator winding melts and triggers a mechanical isolation and thus a termination of the current supply to the stator winding. In addition, the fireproof casing is closed and almost impermeable to air, whereby any oxygen supply promoting or reinforcing the coil burn is greatly reduced and the risk of flame formation as a result of a coil burn is greatly reduced. Due to the multiple parts of the fireproof casing, which is formed by two or more fire protection caps in the engagement position, the stator and the fireproof cover can be provided as a pre-assembled unit, greatly simplifying the installation of the fireproof pump assembly. This also allows for a damaged unit of fireproof cover and stator to be replaced by a new unit after a coil burn has occurred, allowing the fireproof pump assembly to continue to operate.

The core idea of the invention is to enclose the stator winding of an electromotive drive in a fireproof pump assembly with a flame-resistant fireproof cover.

The fire protection caps can be applied to the coil body and, respectively, the joining gap is left free between the fire protection caps and the coil body of the stator.

The fireproof cover can be detachably held on the can in that the can has a can latch protruding from the can flange parallel to the can pot, wherein the can latch engages behind a wall of one of the fire protection caps. In this respect, the fireproof cover can be mounted or positionally secured without tools.

To also achieve the object, the use of a fireproof pump assembly according to the invention in a household appliance, in particular an ice machine, is provided. Especially with household appliances that are operated in continuous operation, such as ice machines in particular, the risk of coil burn is increased, as the end of the service life of the stator winding is reached more quickly. Advantageously, household appliances can be better protected from the consequences of a coil burn by the inventive use of the fireproof pump assembly. The environment or surrounding components of the household appliance with regard to the fireproof pump assembly do not have to be explicitly fire-protected or flame-retardant and a separate casing made of non-flammable material for the household appliance can be dispensed with. The use according to the invention thus enables fire protection to prevent the spread of a coil burn that is easy to implement and economical.

Features and details of the inventive fireproof cover described according to the invention apply, of course, also in connection with the fireproof pump assembly according to the invention, and vice versa. Thus, the disclosure can always be mutually related to the individual aspects of the invention. The drawings serve only by way of example to clarify the invention and have no restrictive character.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
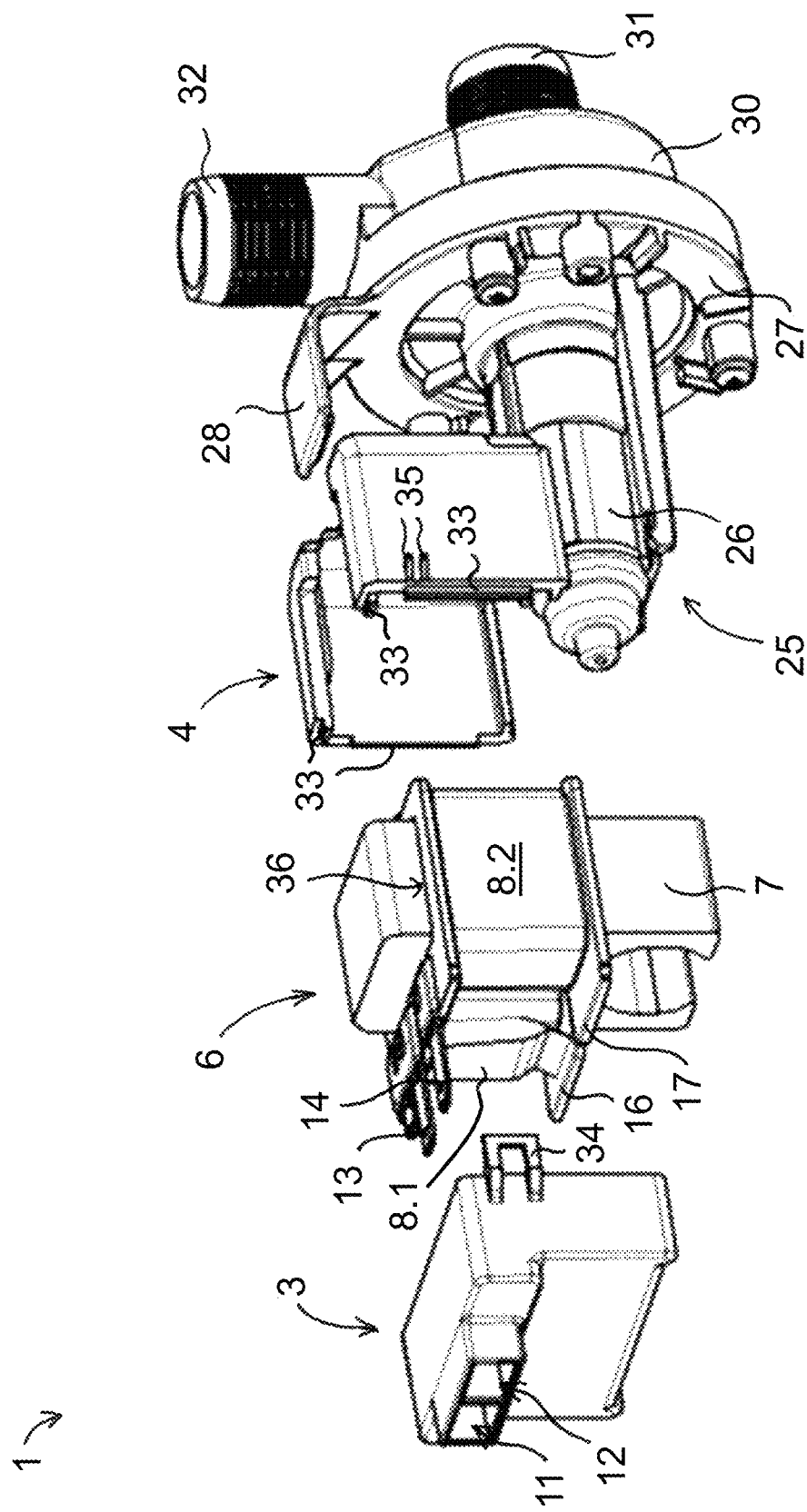
FIG. 1 is an example of a fireproof pump assembly according to the invention in an exploded view.

An embodiment of an inventive fireproof pump assembly 1 is specified in FIGS. 1 to 4.

The fireproof pump assembly 1 comprises an electromotive canned pump with a can 25, with a pump casing 30, with a stator 6, and with a figuratively not shown rotor shaft with an impeller held thereon.

The can 25 comprises an elongated can pot 26, a circumferential can flange 27 protruding from the end side of the can pot 26 and a can latch 28, which protrudes from the can flange 27 in the same direction, parallel to the can pot 26.

The rotor shaft with the impeller held thereon is mounted in the can pot 26 so as to be rotatable relative to the stator 6.

The stator 6 comprises a substantially U-shaped, two-legged iron core 7 and two stator windings 8.1, 8.2, which are wound on two coil bodies 16, 17, each having an electrical connection contact 13, 14 for current supply. The electrical connection contacts 13, 14 are designed here as flat plug contact tags. The coil bodies 16, 17 are connected to each other via a folding hinge and each have a knockout opening inside, via which they are pushed onto legs of the U-shaped iron cores 7. The stator 6 thus formed from the iron core 7 and the coil bodies 16, 17 wound with the stator windings 8.1, 8.2 can be provided as a pre-assembled unit.

The pump casing 30 is connected media-tight to the can flange 27 on a side opposite the can pot 26 and comprises a conveying chamber 29, in which the impeller conveys a liquid during operation, and an inlet nozzle 31 for feeding and a drain nozzle 32 for discharging the liquid into or out of the conveying chamber 29.

According to the invention, the fireproof pump assembly 1 is characterized in that the stator windings 8.1, 8.2 of the stator 6 are enclosed by fire protection caps 3, 4 of an inventive fireproof cover 2 made from a fire resistant or flame retardant material.

Figure 2:
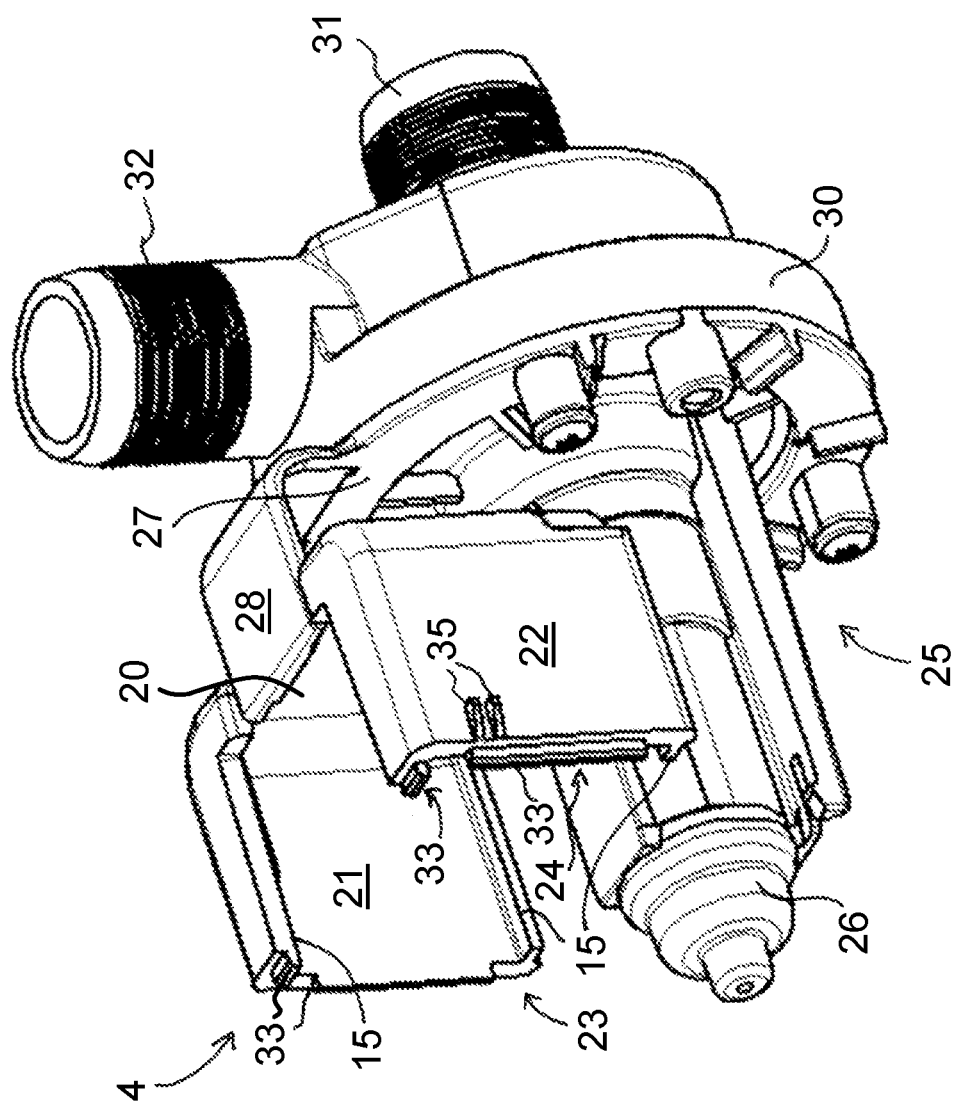
FIG. 2 is the inventive fireproof pump assembly according to FIG. 1 in an assembly interim step in a perspective view.

FIG. 2 shows the inventive fireproof pump assembly 1 in an assembly interim step. The can 25, the pump casing 30 and the rotor shaft with the impeller are connected here as a single unit. In addition, a second fire protection cap 4 of the fireproof cover 2 is detachably held on the can 25 in that the can latch 28 engages behind a wall of the second fire protection cap 4.

Figure 3:
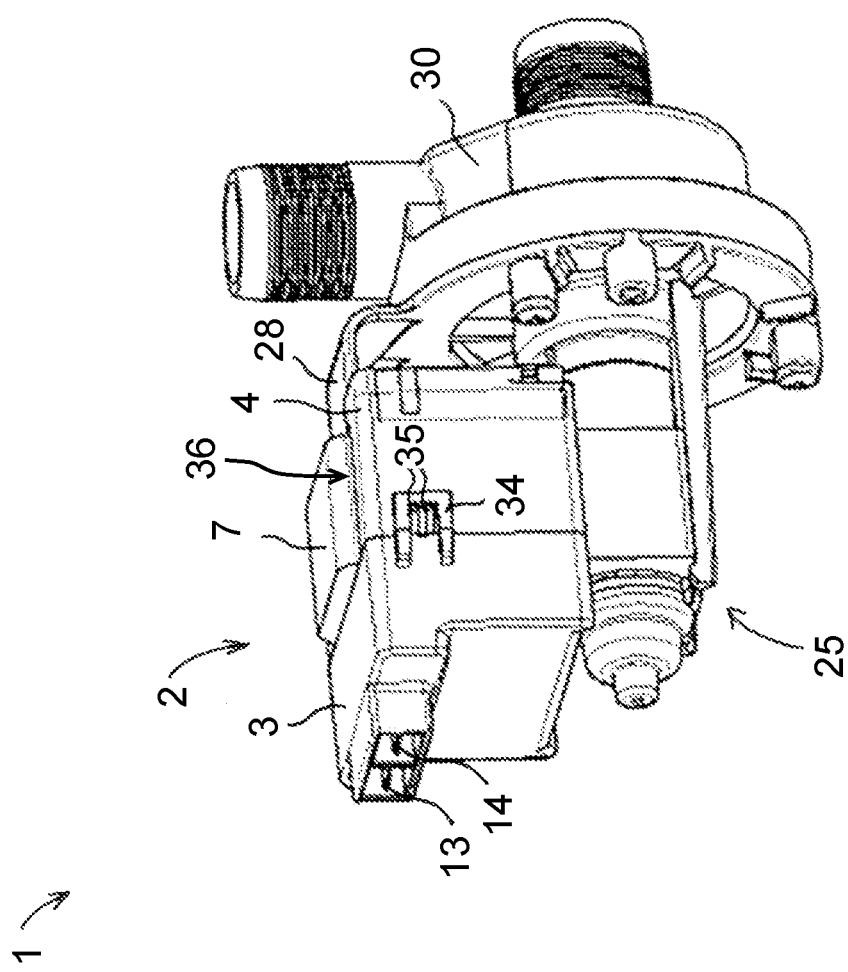
FIG. 3 is the inventive fireproof pump assembly according to FIG. 1 in a perspective view.

The finished assembly of the fireproof pump assembly 1 according to the invention is shown in FIG. 3. Compared to FIG. 2, the stator 6 and a first fire protection cap 3 of the fireproof cover 2 are additionally mounted here. The iron core 7 of the stator 6 is pushed onto the can pot 26 from the outside. The fire protection caps 3, 4 are placed with each other in engagement in an engagement position and form an almost airtight, closed fireproof casing for the stator windings 8.1, 8.2 of the stator 7.

Air permeability of the fireproof casing is provided in that between the fire protection caps 3, 4 or between the fire protection caps 3, 4 and the iron core 7 or between the fire protection caps 3, 4 and the coil bodies 16, 17 of the stator 6, a joining gap 10 is left free, and in that the first fire protection cap 3 has two cap openings 11, 12 for carrying through the electrical connection contacts 13, 14 for the stator windings 8.1, 8.2. In the event of a coil burn, in which a high rise in temperature occurs as a result of an electrical short circuit of the stator windings 8.1, 8.2 and flame formation may occur, the fireproof casing formed by the fire protection caps 3, 4 creates a reliable enclosure for the stator windings 8.1, 8.2, which prevents spread of the coil burn or the flames to surrounding components.

The fire protection caps 3, 4 are made for this purpose on the one hand of a flameproofing material (flame retardant) with a sufficient wall thickness such that they can withstand the high temperatures or flames in a coil burn without major deformations or melting until a coil wire of the burning stator windings 8.1, 8.2 is melted and the current supply for the stator windings 8.1, 8.2 has been stopped.

In addition, only a small amount of atmospheric oxygen reaches through the almost airtight fireproof casing, whereby advantageously the coil burn and the risk of flame exposure are greatly reduced. In this case, the fire protection caps 3, 4 do not form a completely airtight, i.e., media-tight fireproof casing, in order to ensure that in the event of a coil burn any flue gas developed can escape and there is no overpressure inside the fireproof casing. Eruptive material separation, such as copper spatter, which can occur as a result of the coil wire melting in the coil burn, as well as flying sparks are also prevented by the fireproof casing.

Figure 4:
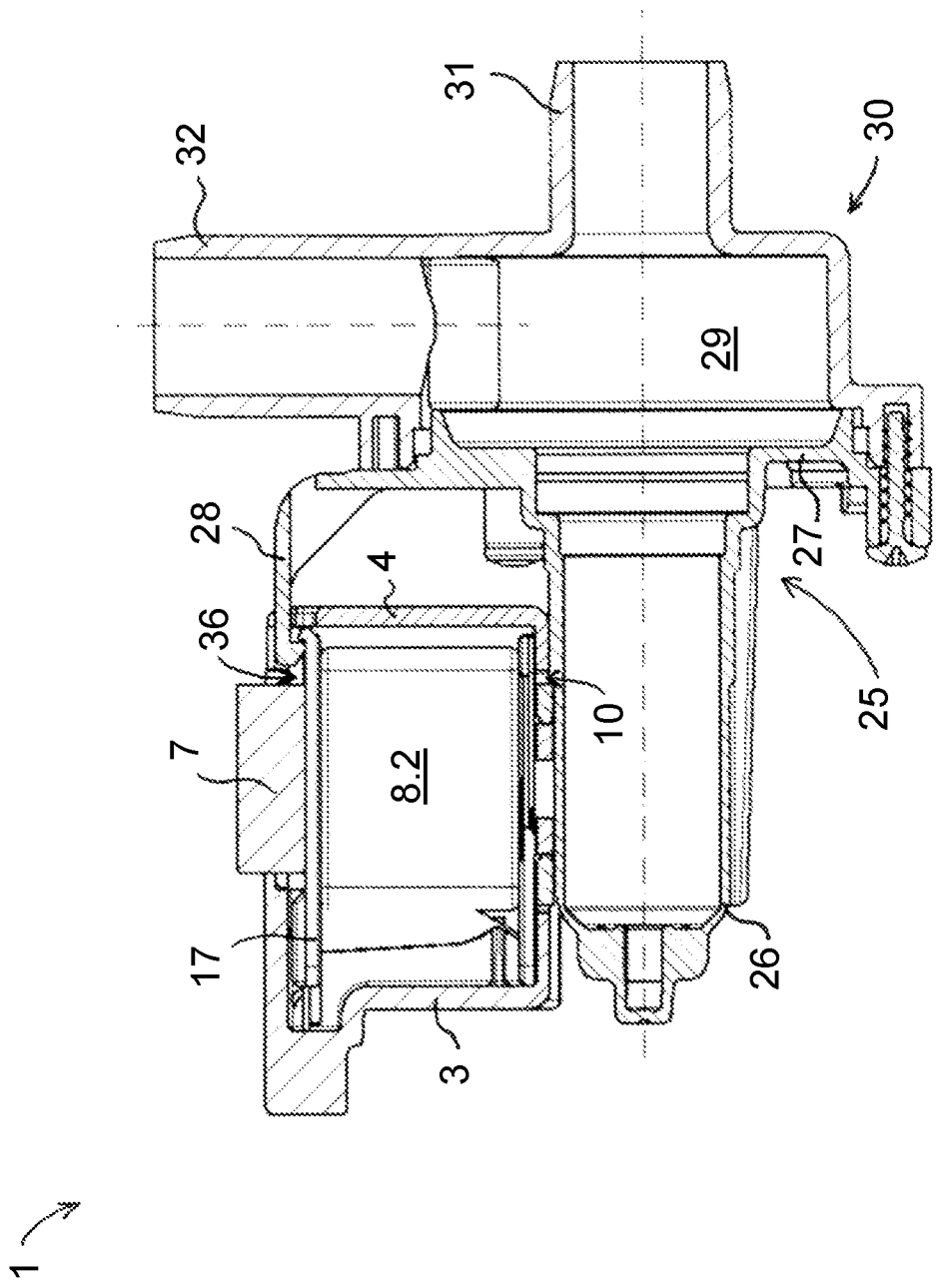
FIG. 4 is the inventive fireproof pump assembly according to FIG. 1 in full section.
Figure 5:
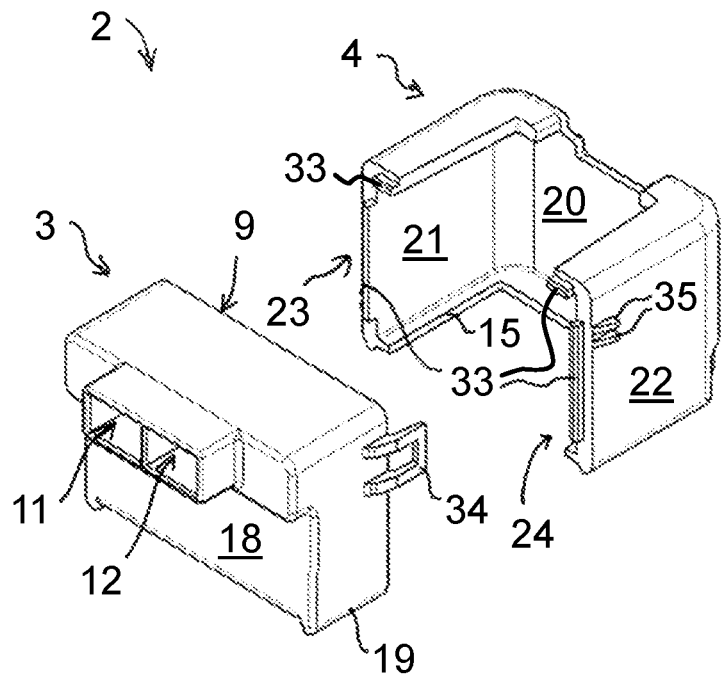
FIG. 5 is an example of an inventive fireproof cover in a first perspective view from above.
Figure 6:
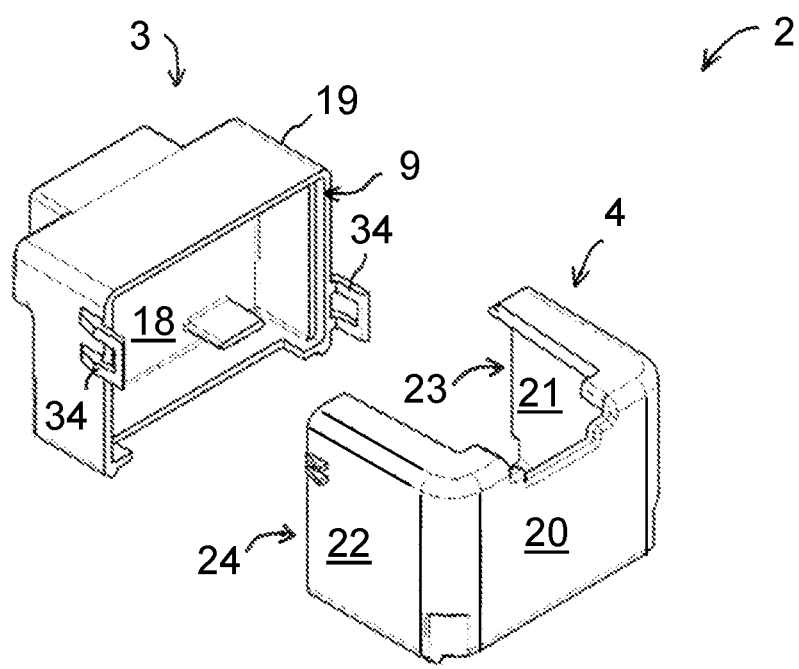
FIG. 6 is the inventive fireproof cover according to FIG. 5 in a second perspective view from above.
Figure 7:
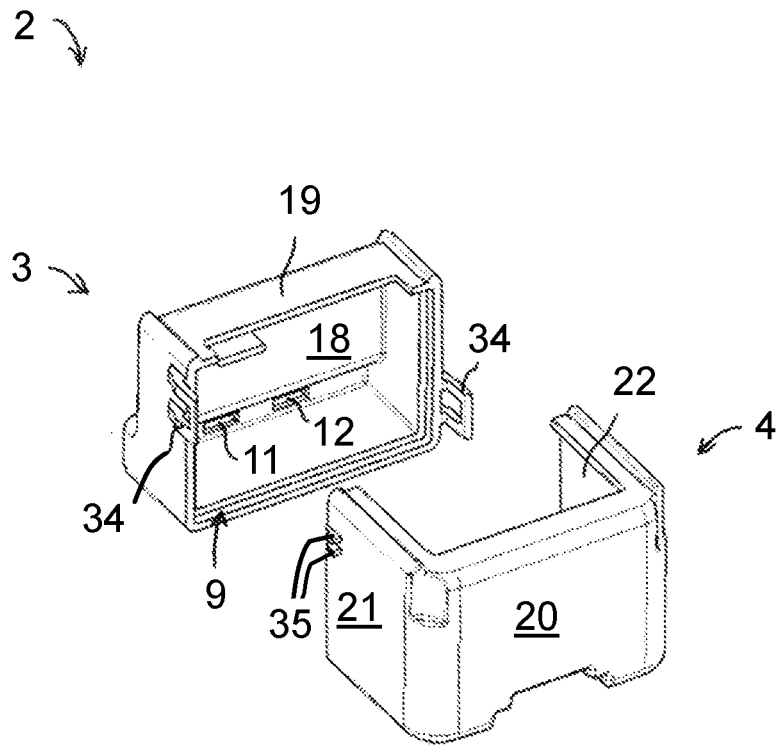
FIG. 7 is the inventive fireproof cover according to FIG. 5 in a perspective view from below.

A sectional view of the fireproof pump assembly 1 according to the invention can be seen in FIG. 4. For reasons of simplification, the rotor shaft and the impeller held thereon are not shown here. In the sectional view it can be seen that the coil bodies 16, 17 and the stator windings 8.1, 8.2 are enclosed by the fire protection caps 3, 4. The iron core 7 is thereby passed through a knockout opening 36, which is formed between the fire protection caps 3, 4 placed in engagement with each other. In addition, a joining gap 10 is left free between the iron core 7 and the fire protection caps 3, 4.

The can latch 28 engages behind the wall of the second fire protection cap 4 and is latched with the latching projection of the coil bodies 16, 17. In this respect, both the fire protection caps 3, 4 and the stator 6 are held in a defined position on the can 25 via the can latch 28.

FIGS. 5 to 8 each indicate a perspective single view of the fireproof cover 2 according to the invention, as provided in the embodiment of the fireproof pump assembly 1 according to FIGS. 1 to 4.

The first fire protection cap 3 is tub-shaped with a cap bottom 18 in which the first cap opening 11 and second cap opening 12 are provided, and with a cap collar 19 protruding circumferentially from the cap bottom 18. At the cap collar 19, U-shaped latching projections 34 are provided on opposite outer faces.

The second fire protection cap 4 has a U-shaped form in profile cross-section with a connecting section 20 and with two leg sections 21, 22 of equal length protruding in the same direction perpendicular to the connecting section. At leg ends 23, 24 of the leg sections 21, 22, positioning bars 33 and, on outer faces of the leg sections 21, 22, latching lugs 35 are provided. The latching lugs 35 form in the engagement position a latching connection with the latching projections 34 of the first fire protection cap 3. The positioning bars 33 of the second fire protection cap 4 engage in the collar edge 9 of the cap collar 19 in the engagement position, which is designed stepped for this purpose.

Furthermore, the fire protection caps 3, 4 provide guide bars 15 in the interior, which serve to guide the coil bodies 16, 17 of the stator 6.

Figure 8:
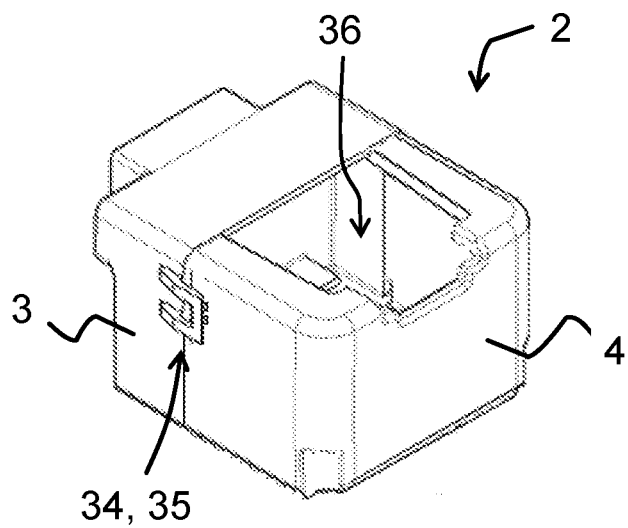
FIG. 8 is the inventive fireproof cover according to FIG. 5 placed in an engagement position in a perspective view from above.

FIG. 8 shows the fire protection caps 3, 4 in the engagement position. In this case, between the fire protection caps 3, 4, the substantially rectangular knockout opening 36 for the iron core 7 of the stator 6 is formed and the latching projections 34 of the first fire protection cap 3 engage behind the latching lugs 35 of the second fire protection cap 4, whereby a detachable latching connection is formed.

The invention is not limited to the figurative embodiment of the fireproof pump assembly 1 or fireproof cover 2 according to the invention. In particular, the components are freely selectable with regard to their shape, dimensioning and arrangement to each other within wide limits.

According to an alternative embodiment, the fireproof cover 2 according to the invention provides for three or more fire protection caps 3, 4, which can be placed together in engagement to form the fireproof casing.

The fireproof pump assembly 1 may have a differently constructed electric drive according to an alternative embodiment.

A use according to the invention is the fireproof pump assembly 1 in a household appliance, in particular an ice machine.

The fireproof cover 2 according to the invention is by no means limited to the use in an electromotive pump or fireproof pump assembly 1. The fireproof cover 2 can basically be used in electromotive drives of various types and beyond the area of application of pumps.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fireproof pump assembly for pumping liquids in a household appliance, the assembly comprising:
    an electromotive drive that includes a stator and a can, the can comprising a can pot and a can flange protruding from the can pot, with a rotor shaft held in the can pot so as to be rotatable relative to the stator, the stator having an iron core placed on the can pot, and at least one coil body enclosing the iron core and wound with at least one stator winding;
    an impeller held on the rotor shaft;
    a pump casing held on the can flange with a conveying space receiving the impeller and having an inlet nozzle and a drain nozzle; and
    a fireproof cover to cover the at least one stator winding, wherein the fireproof cover has two or more fire protection caps which are made of a flame retardant material and are placed together in an engagement position,
    wherein the fire protection caps, in the engagement position, form a knockout opening through which a portion of the iron core of the stator extends, wherein the fire protection caps, in the engagement position, form a fireproof casing for the at least one stator winding, which is air-permeable through a joining gap between the fire protection caps and/or between at least one of the fire protection caps and the stator, to prevent flying sparks and flame propagation resulting from a coil burn of the at least one stator winding, and
    wherein the fireproof cover is held detachably on the can by a can latch that protrudes from the can flange parallel to the can pot, the can latch partly extending into the knockout opening of the fireproof cover to engage behind a wall of one of the fire protection caps and latch onto the at least one coil body.

2. The fireproof pump assembly according to claim 1, wherein the joining gap is provided between the fire protection caps and the at least one coil body.

3. The fireproof pump assembly according to claim 1, wherein the household appliance is an ice machine.

4. The fireproof assembly according to claim 1, wherein the iron core is a magnetized stack of stator sheets.

5. The fireproof assembly according to claim 1, wherein the can latch latches onto a latching projection of the at least one coil body.

6. The fireproof assembly according to claim 1, wherein the fire protection caps are made of a flame-retardant plastic.

7. The fireproof assembly according to claim 6, wherein the flame-retardant plastic is polyamide having at least 25 weight percent glass fibers or the flame-retardant plastic is brominated polyamide.

8. The fireproof assembly according to claim 1, wherein the fire protection caps include a first fire protection cap and a second fire protection cap, and wherein the first fire protection cap has latching projections that engage with latching lugs of the second protection cap to connect the first and second fire protection caps together.

9. The fireproof assembly according claim 1, wherein the fire protection caps include a first fire protection cap and a second fire protection cap, and wherein the first fire protection cap has a first end face with a recessed collar edge and the second fire protection cap has a second end face having positioning bars protruding therefrom, wherein when the first fire protection cap is engaged with the second fire protection cap, the positioning bars of the second fire protection cap are inserted into the recessed collar edge of the first fire protection cap.

10. The fireproof assembly according to claim 1, wherein an interior of each of the fire protection caps have guide bars that guide the at least one coil body.

11. The fireproof assembly according to claim 1, wherein the fire protection caps include a first fire protection cap and a second fire protection cap, wherein the first fire protection cap is tub-shaped with a cap bottom and a circumferential cap collar protruding from the cap bottom, wherein the second fire protection cap is U-shaped in a profile cross-section with a connecting section and two leg sections protruding from a same side of the connecting section, and wherein the cap collar of the first fire protection cap engages with leg ends of the two leg sections of the second fire protection cap.

* * * * *